(12) United States Patent
Khial (10) Patent No.: US 7,885,717 B2
(45) Date of Patent: Feb. 8, 2011

(54) FAST CONTROL LAW OPTIMIZATION

(75) Inventor: Karim Khial, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 344 days.

(21) Appl. No.: 12/060,185

(22) Filed: Mar. 31, 2008

(65) Prior Publication Data

US 2009/0248371 A1 Oct. 1, 2009

(51) Int. Cl.
G05B 13/02 (2006.01)
G06F 7/60 (2006.01)

(52) U.S. Cl. .............................. 700/29; 700/44; 700/30; 700/31; 700/33; 703/2

(58) Field of Classification Search .................. 700/29, 700/44, 30, 31, 33; 703/2
See application file for complete search history.

(56) References Cited

U.S. PATENT DOCUMENTS

| | | | | |
|---|---|---|---|---|
| 4,679,103 A | * | 7/1987 | Workman | ................. 360/78.07 |
| 5,369,345 A | * | 11/1994 | Phan et al. | ................... 318/561 |
| 5,548,293 A | | 8/1996 | Cohen | |
| 5,642,722 A | | 7/1997 | Schumacher et al. | |
| 5,682,309 A | | 10/1997 | Bartusiak et al. | |
| 5,819,714 A | | 10/1998 | Bush et al. | |
| 6,289,508 B1 | | 9/2001 | Erickson et al. | |
| 6,330,483 B1 | | 12/2001 | Dailey | |
| 6,349,266 B1 | * | 2/2002 | Lysaght et al. | ................. 702/41 |
| 6,439,469 B1 | | 8/2002 | Gruber et al. | |
| 7,082,305 B2 | | 7/2006 | Willars et al. | |
| 7,152,023 B2 | * | 12/2006 | Das | ............................... 703/2 |
| 7,159,825 B2 | | 1/2007 | Seve | |
| 7,191,985 B2 | | 3/2007 | Najmabadi et al. | |
| 7,198,225 B2 | | 4/2007 | Lisoski et al. | |
| 7,249,732 B2 | | 7/2007 | Sanders, Jr. et al. | |
| 7,252,263 B1 | | 8/2007 | Hagemeister et al. | |
| 7,255,306 B2 | * | 8/2007 | Jones et al. | ............... 244/76 R |
| 7,264,200 B2 | | 9/2007 | Bussom et al. | |
| 7,328,074 B2 | | 2/2008 | Das et al. | |
| 7,346,401 B2 | * | 3/2008 | Diao et al. | ..................... 700/28 |
| 7,400,933 B2 | * | 7/2008 | Rawlings et al. | .............. 700/28 |
| 7,529,652 B1 | * | 5/2009 | Gahinet et al. | .................. 703/2 |
| 7,647,213 B1 | * | 1/2010 | Gahinet et al. | .................. 703/2 |
| 2003/0153990 A1 | * | 8/2003 | Boiko | .......................... 700/37 |
| 2003/0171901 A1 | * | 9/2003 | Salsbury | ......................... 703/2 |
| 2004/0162709 A1 | | 8/2004 | Das | |
| 2005/0060129 A1 | * | 3/2005 | Mosterman et al. | ............ 703/2 |
| 2005/0209714 A1 | * | 9/2005 | Rawlings et al. | .............. 700/29 |
| 2006/0282178 A1 | | 12/2006 | Das et al. | |
| 2009/0012754 A1 | * | 1/2009 | Mosterman et al. | ............ 703/2 |

* cited by examiner

*Primary Examiner*—Albert DeCady
*Assistant Examiner*—Jason Lin
(74) *Attorney, Agent, or Firm*—Carlson, Gaskey & Olds, PC (57) ABSTRACT

A computer-implemented method to optimize control laws (CLaws) includes inserting a unit delay downstream of at least one gain in a system model to define an extended system model and linearizing the extended system model to define an extended linear state model. On a computer at least one matrix is computed from the extended linear model. A control law is optimized using a plurality of linear models from a linear model library computed with the at least one matrix.

5 Claims, 12 Drawing Sheets

System states are extended by inserting unit delay downstream of each gain as illustrated in figure (5). States due to the unit delays, referred to herein as gain states, have a state equation of a form of equation (2).

The extended system is linearized

The extended state vector is arranged such that the extended linear model has a form of equation (3), therefore, the A and B matrices of the linear models are computer with equation (4), which is used by the CLAW optimization process as shown in Figure (6).

Meet all specs for all modes with one gain (challenging) → Robust

| | Specs eval time | Optimization |
|---|---|---|
| Low Speed with 200 specs (Hover,hover_climb.20kts_TC_off. 20kts_TC_on& 40kts) Optimization: 500 iterations | Prior Art Actual Optimization — 1 h | 1 month |
| | Fast Technique — 1 min | 10 h |

FIG. 7

FAST CONTROL LAW OPTIMIZATION

STATEMENT REGARDING FEDERALLY SPONSORED RESEARCH OR DEVELOPMENT

This invention was made with Government support under W58RGZ-06-0045 awarded by The United States Army. The Government has certain rights in this invention.

BACKGROUND

The present invention relates to control law (CLaw) optimization.

Optimization is of particular importance in control law (CLaw) process design. Conventional optimization algorithms include an optimization loop that tunes the controller parameters (e.g., gains, time constants) so as to minimize the cost functions to ensure that CLaws meet the desired system requirements and specifications.

The time required to optimize each CLaw is relatively long which may extend the control design process and thus an overall test process such as an aircraft flight test schedule.

SUMMARY

A method to optimize control laws according to an exemplary aspect of the present invention includes: inserting a unit delay downstream of at least one gain in a system model to define an extended system model; linearizing the extended system model to define an extended linear model; computing at least one matrice from the extended linear model; and optimizing a control law with the linear models computed through the matrices.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
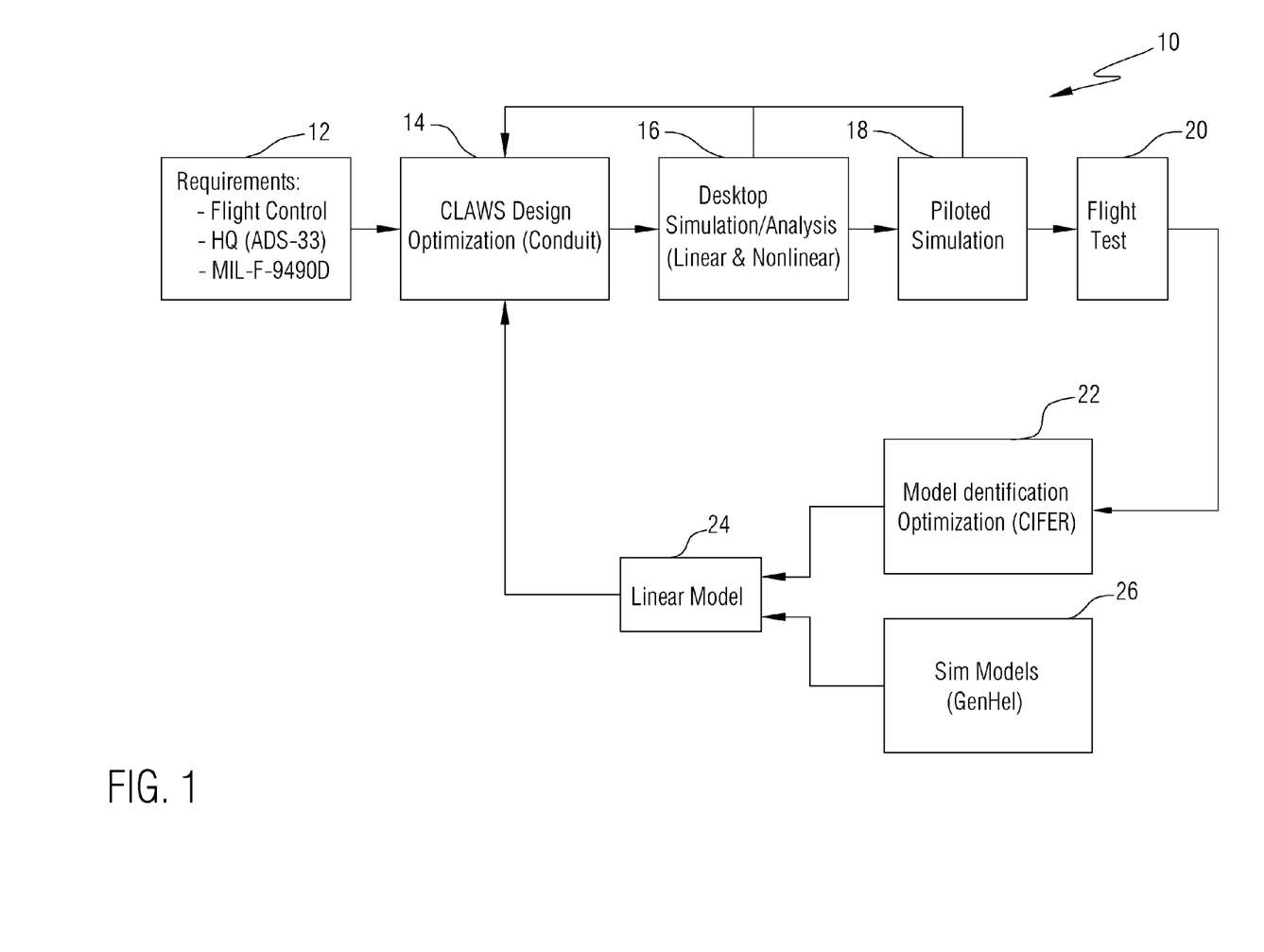
FIG. 1 is a schematic block diagram of a control law design process.

Referring to FIG. 1, a control law (CLaw) design process 10 generally begins with a multiple of requirements 12 which are often referred to as specifications or constraints. The requirements 12 are utilized to design and optimize control laws (CLaws) 14 with software such as, for example only, the NASA Ames Research Center Control Designer's Unit Interface (CONDUIT) integrated control system software package. The CLaws 14 are analyzed in desktop simulation 16 and piloted simulation 18 which are utilized to further optimize the CLaws 14.

The CLaws 14 are then subject to a flight test 20 where pilot handling and control authority issues are utilized to identify and optimize 22 a linear model 24 of the aircraft along with other simulators 26. The model identification and optimization 22 may be performed with software such as, for example only, the NASA Ames Research Center CIFER software package. System identification begins with measured aircraft motion and "inverts" the responses to rapidly extract a model that accurately reflects the measured aircraft motion. System identification is a procedure by which a mathematical description or linear model 24 of the vehicle or component dynamic behavior is extracted from the test data such as the flight test 20. The model identification and optimization 22 may be considered as an inverse of simulation which is utilized to improve the linear model 24 which is then utilized to further optimize the CLaws 14

Figure 2:
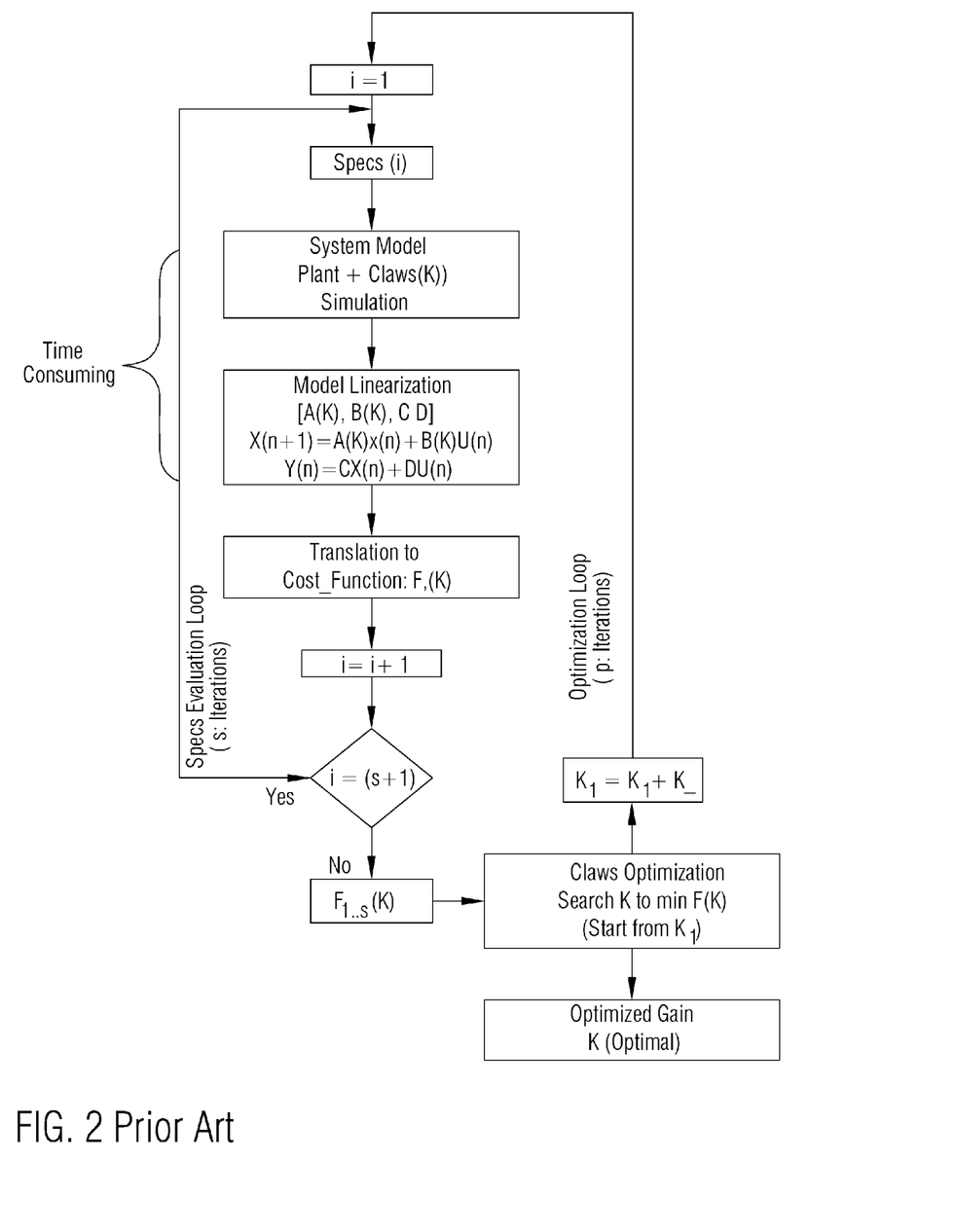
FIG. 2 is a schematic block diagram of a prior art conventional CLaw optimization algorithm.

Referring to FIG. 2, a conventional optimization algorithm is illustrated in a block diagram form. The "CLaws optimization" block is a mathematical program that, starting from a first iteration (j=1) and using some initial guess of the CLaw gain $K_{j=1}$, minimizes the cost function $F_j(K_j)$ computed through the $j^{th}$ iteration, by systematically choosing the CLaw gain $K_{j+1}$ from within an allowed set; $K_{j+1}$ is used in the next iteration (j+1) to compute the cost function $F_{j+1}(K_{j+1})$. As the minimum of the cost function $F_p$ is reached for a given iteration j=p, the "CLaws optimization" block provides the optimized gain called K(optimal) as an output. The K(optimal) is used within the aircraft flight Claw to meet the flight requirements.

The cost functions are computed through an evaluation loop that requires for each spec a linear model of the system model, which includes the plant and the CLaw models. For $i^{th}$ spec (i<s+1 where s is the specs number), the system model is simulated and linearized using a linearization technique through the "model linearization" block.

Basically, the linear models are represented in the discrete linear state equation, written in the form of a system linear state equation (without unit delays):

$$\begin{cases} X_{sys}(d+1) = A(K)X_{sys}(d) + B(K)U(d) \\ Y(d+1) = CX_{sys}(d) + DU(d) \end{cases} \quad (1)$$

where
d: sampling time;
n: system states dimension;
m: system input vector dimension
q: system output dimension;
k: Claws gain vector dimension;
$K \in \Re^k$: Claw gain vector K=[$K_1 \ldots K_k$];
$X_{sys} \in \Re^n$: system state vector (plant, actuators, sensors, filters and claws states);
$U \in \Re^m$: system input vector;
$Y \in \Re^q$: system output signal vector;
$A(K) \in \Re^{n \times n}$ and $B(K) \in \Re^{n \times m}$ are variant matrices, i.e. are function of the Claw gain vector K;
$C \in \Re^{q \times n}$ and $D \in \Re^{q \times m}$ are constant (invariant) matrices.

Because the A and B matrices are a function of the controller gains K, conventional CLaw optimization methods (e.g., CONDUIT), generate linear models during the iterations (on-line model linearization). The time required to generate such linear models is relatively long and results in a relatively time consuming CLaw optimization which extends the control design process and thus the overall optimization. For large systems typical of an aircraft flight control system, this online model linearization results in a relatively time consuming optimization process.

The invention disclosed herein provides a technique that accelerates the CLaw optimization process and thereby reduces the overall optimization time. Unlike conventional methods, the fast optimization technique of the present invention generates the linear models separate from the iterations (offline models linearization). During the CLaw optimization process, the linear models are computed through matrices manipulations.

Figure 5:
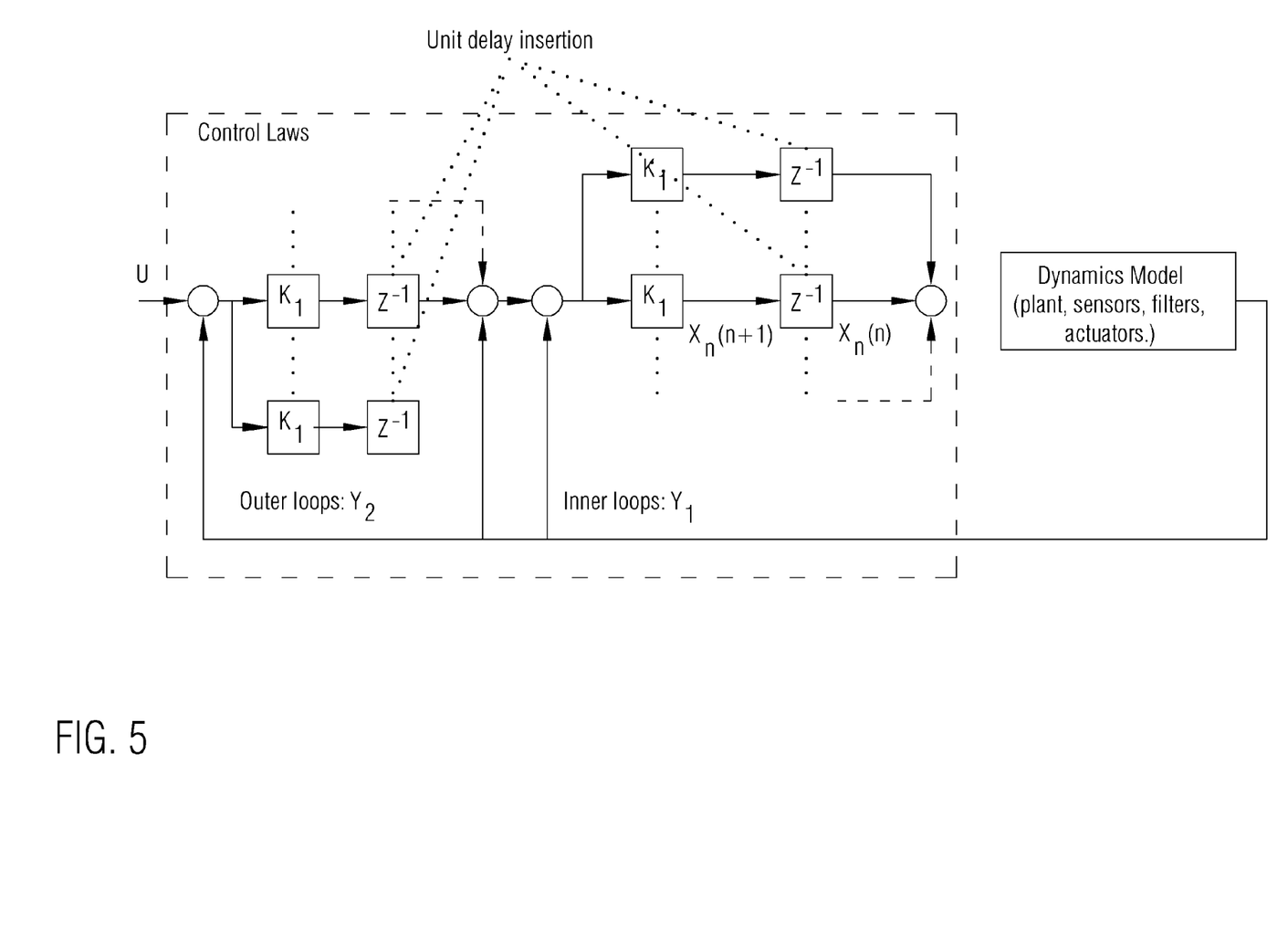
FIG. 5 is a schematic block diagram of a state model extension in which system states are extended by insertion of a unit delay downstream of each gain to provide a gain state therefore.

During this offline model linearization, the gains K are extracted from the model by extending the states of the system model (FIG. 5). The gains K become symbolic parameters of the resulting linear models such that for given values of K, the linear models may then be computed by relatively simple matrices manipulation. The Inner loops includes low level CLaws such as the aircraft rate/attitude (pitch, roll and yaw) CLaws; the Outer loops includes high level CLaws such as the aircraft velocity/position (airspeed, sideslip, altitude) CLaws.

Figure 3A:
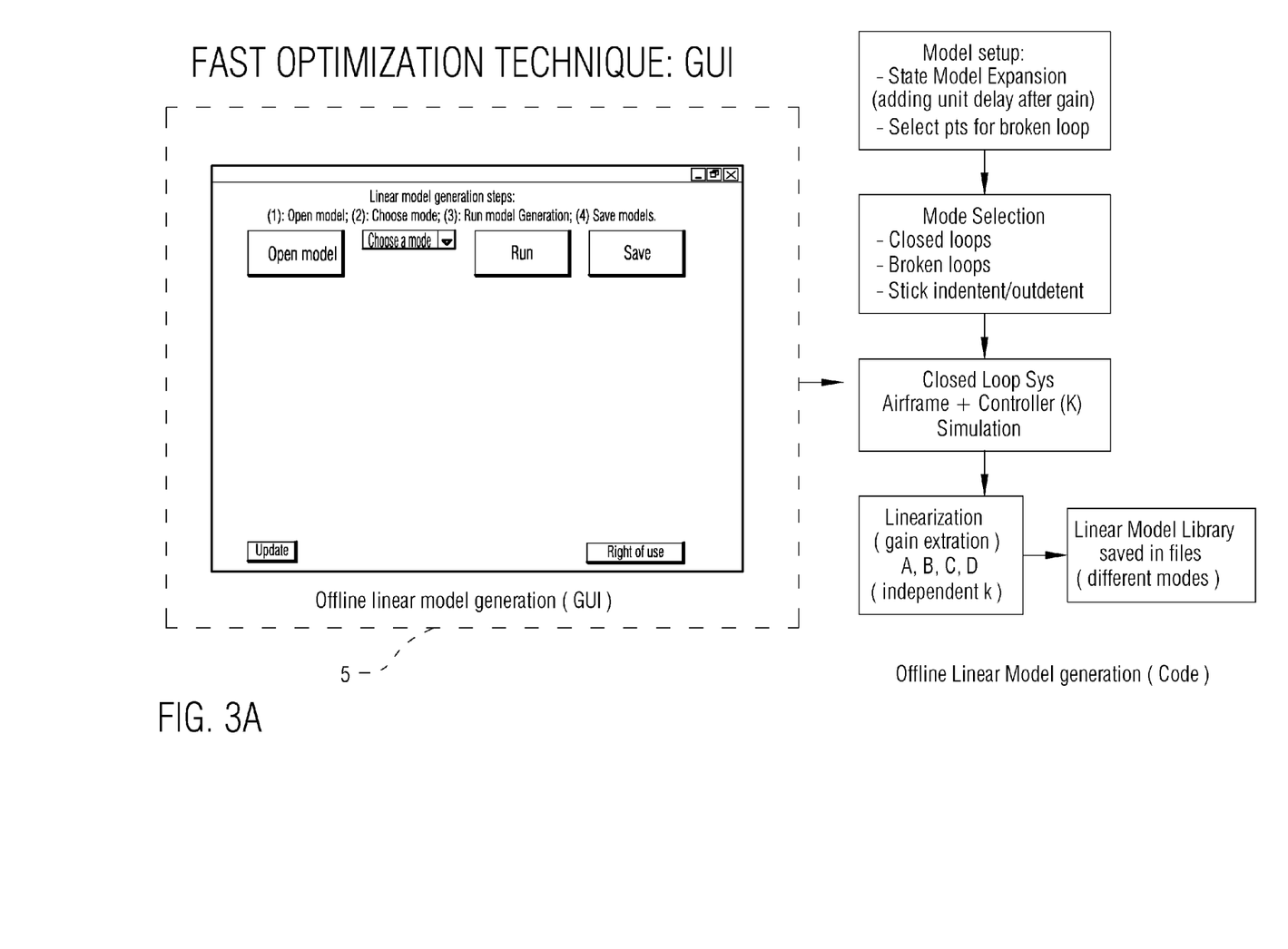
FIGS. 3A-3F are schematic block diagrams of an offline linear model generation graphical user interface to obtain a linear model library for different modes of the system.
Figure 3B:
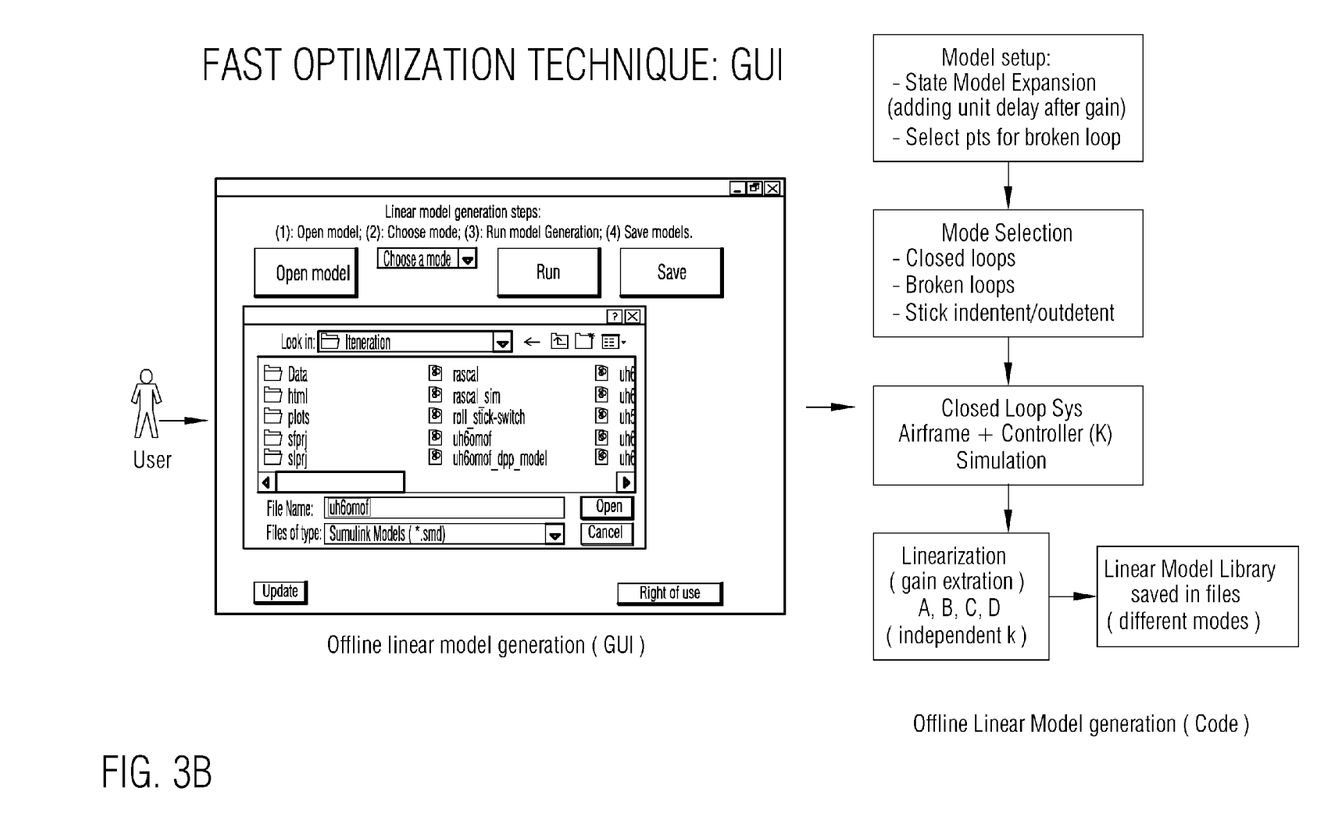

Referring to FIG. 3A, computation of the linear model may be facilitated through softwares (illustrated schematically) which provides a graphical user interface (GUI). It should be noted that a computing device can be used to implement various software functionality, such as that attributable to the technique that accelerates the CLaw optimization process. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or non-volatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 3C:
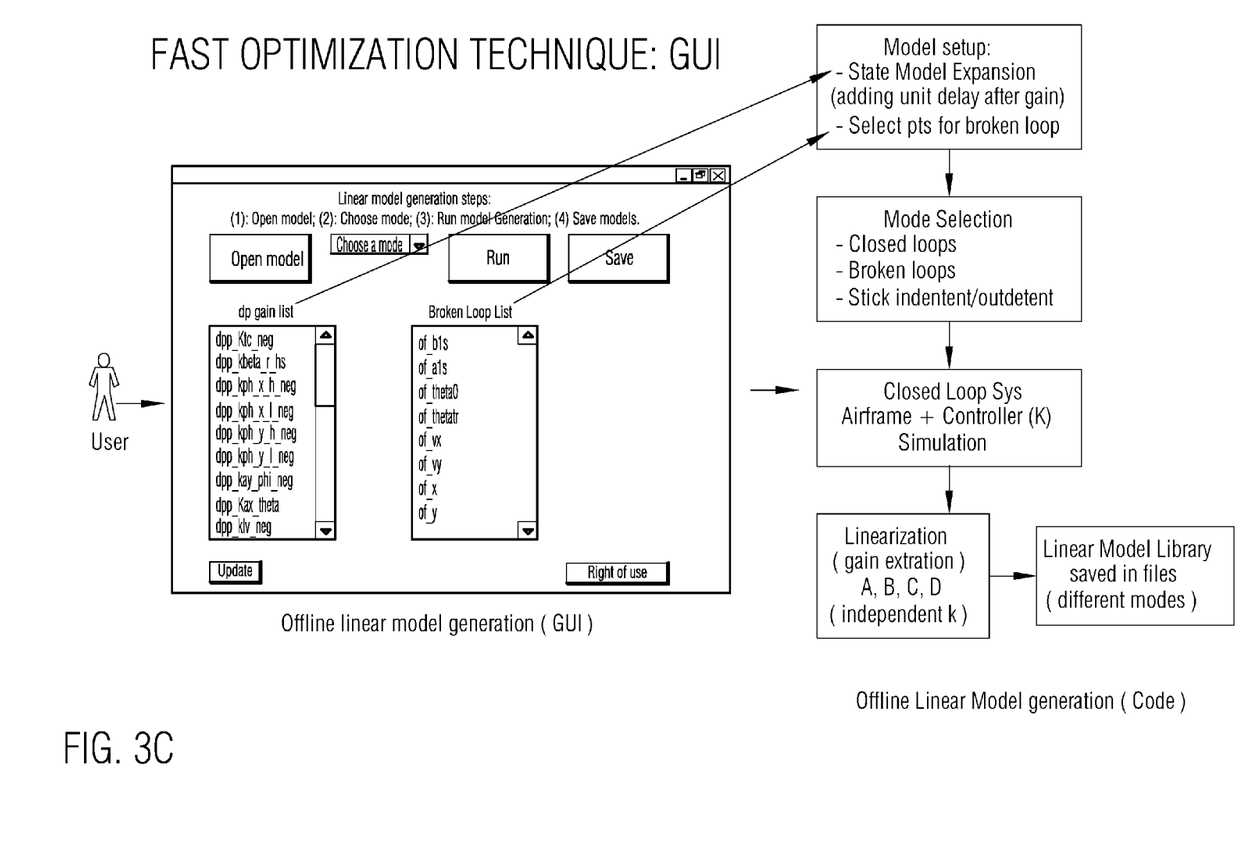
Figure 3D:
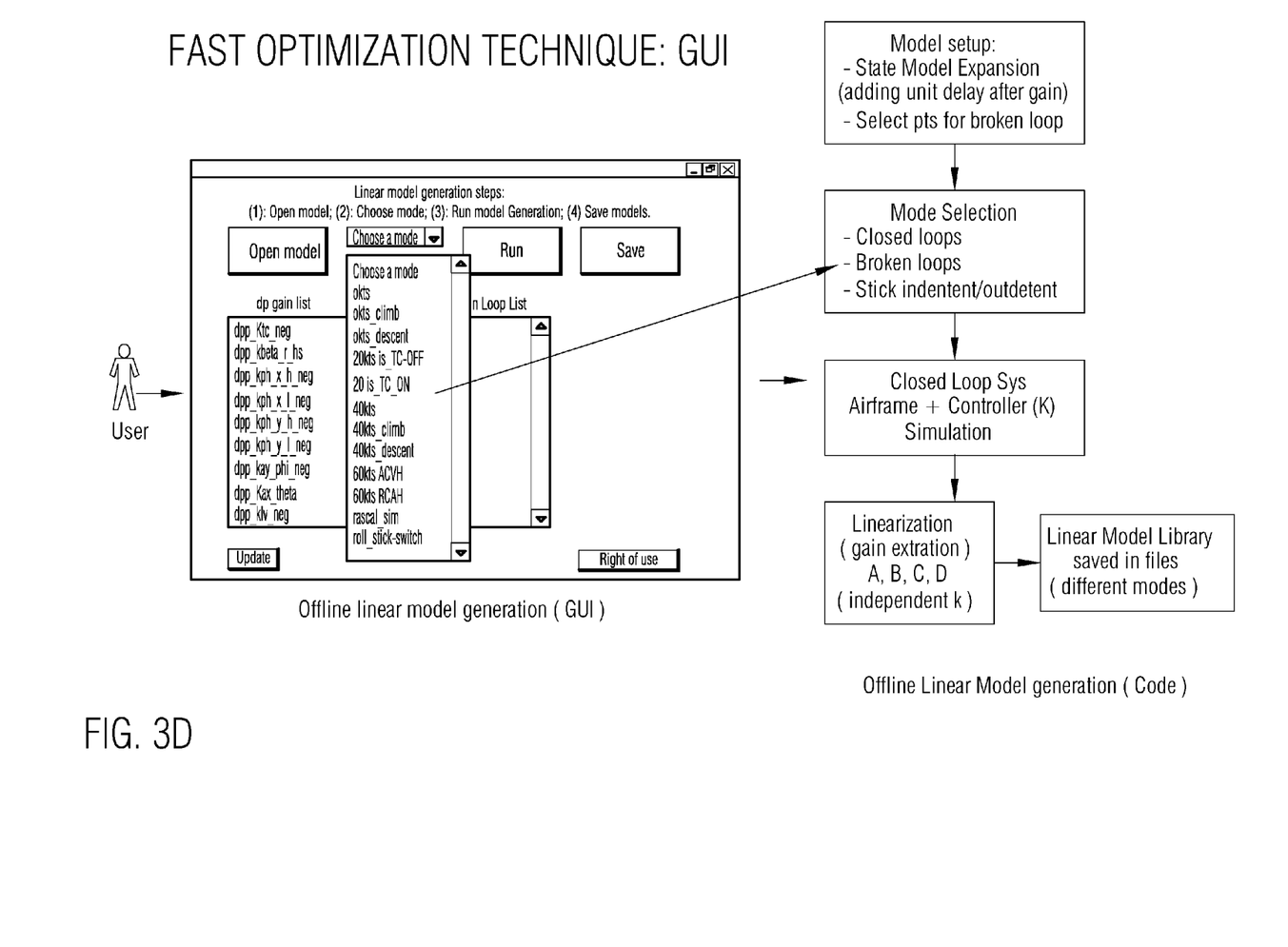
Figure 3E:
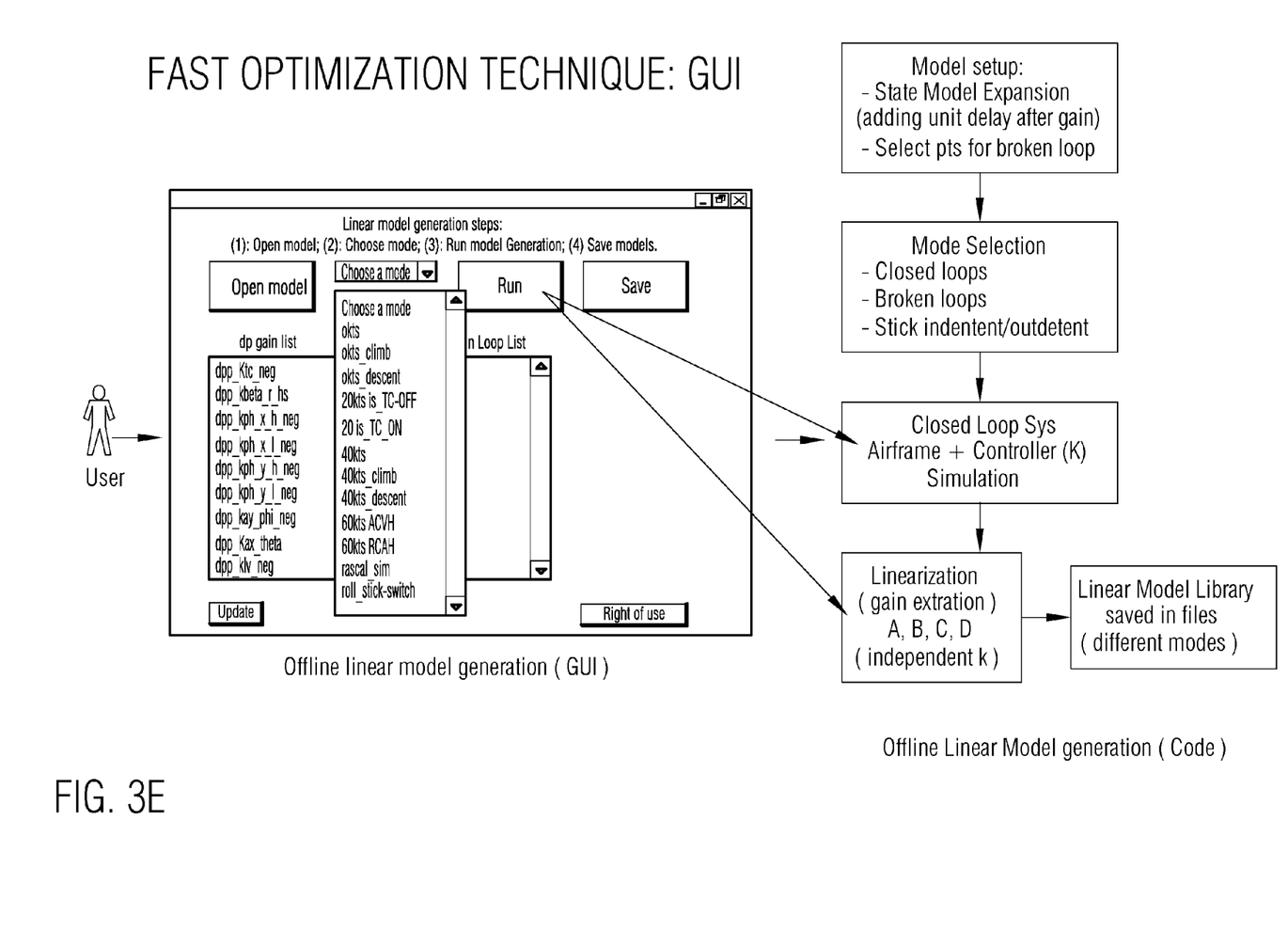
Figure 3F:
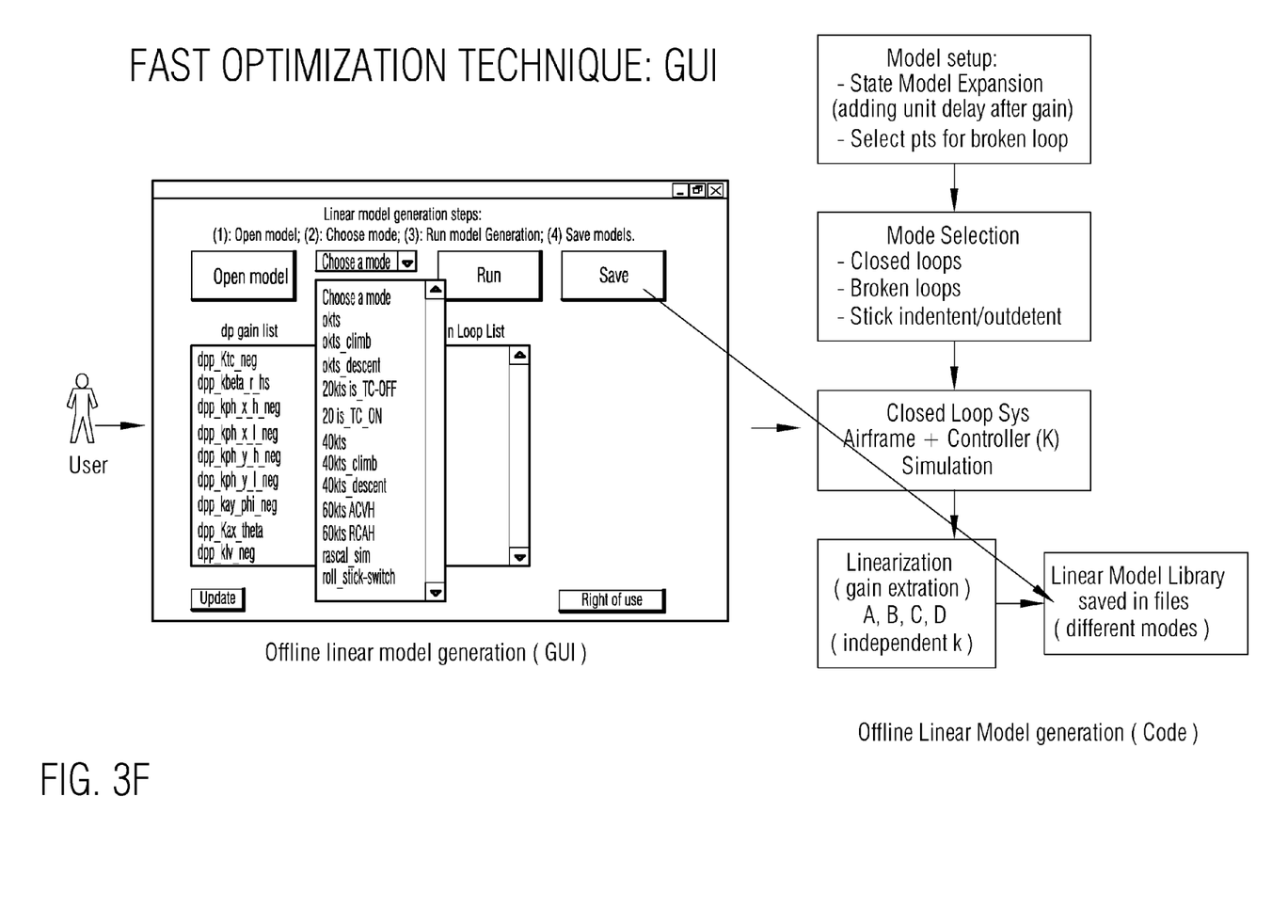

The model (aircraft type for example) is opened. The software detects automatically the CLaw gain names and the broken loop point locations, which are listed on their respective GUI windows "dp gain list" and "broken loop list" (FIG. 3C). The mode—such as hover, climb, forward flight, descent and the like—is then selected (FIG. 3D). The simulation setup such as switches and parameters are set in order to specify the pilot sticks command conditions (stick in detent or out of detent). Once the selections are made the program is run to perform the linearization to obtain the linear models (FIG. 3E). The linear models may then be saved in a linear model library for each desired mode such as hover, climb, forward flight, descent and the like (FIG. 3F).

Figure 4:
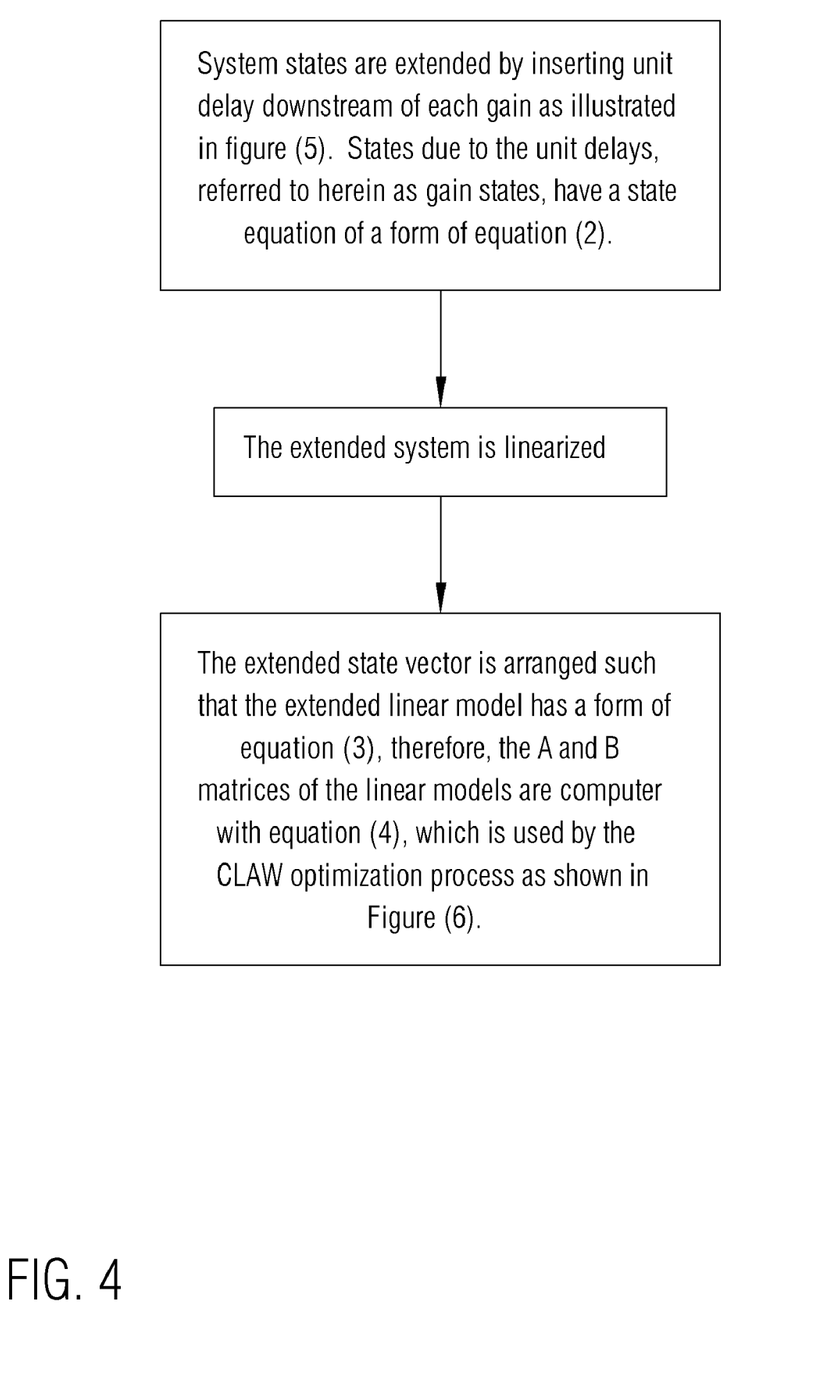
FIG. 4 is a schematic block diagram of the steps of the design and optimization of CLaws according to one non-limiting embodiment of the present invention.

Referring to FIG. 4, the design and optimization of the CLaws according to the invention disclosed herein is as follows:

System states are extended by inserting unit delay downstream of each gain (FIG. 5). States due to the unit delays, referred to herein as gain states, have a state equation of a form of equation (2).

$$X_{K_i}(d+1) = K_i[A_i X_{ext}(d) + B_i U(d)]; i=1 \ldots k \qquad (2)$$

where $K_i$: $i^{th}$ Claw gain;

$X_{ext} = [X_K \, X_{sys}]' \in \Re^{k+n}$: extended state vector;

$X_K = [X_{K_1} \ldots X_{K_k}]' \in \Re^k$: gain state vector;

$A_i \in \Re^{1 \times (k+n)}$ and $B_i \in \Re^{1 \times (m)}$ for i=1 . . . k; are constant (invariant) matrices, i.e. independent of the Claw gain K.

The extended system is then linearized. Linearization may be achieved with a linearization function of conventional software packages such as the "linearize" function in Matlab. The linearized extended system state vector is then arranged such that the extended system linear state has a form of equation (3):

$$\begin{cases} X_{ext}(d+1) = \begin{bmatrix} \text{diag}(K) & 0^{k \times n} \\ 0^{n \times k} & \text{diag}(I^n) \end{bmatrix} [A^* X_{ext}(d) + B^* U(d)] \\ Y(d+1) = [\ 0^{q \times k} \quad C^*\ ] X_{ext}(d) + D^* U(d) \end{cases} \quad (3)$$

where $X_{ext}=[X_K\ X_{sys}]' \in \Re^{k+n}$: extended state vector;

$X_K=[X_{K_1} \ldots X_{K_k}]' \in \Re^k$: gain state vector;

$A^* \in \Re^{(k+n) \times (k+n)}$, $B^* \in \Re^{(k+n) \times m}$, $C^* \in \Re^{q \times (n)}$ and $D^* \in \Re^{q \times (m)}$ are constant (invariant) matrices, i.e. independent of the Claw gain K, that are saved in the linear model library and are used in equation (4) to compute the linear models of the system.

Figure 6:
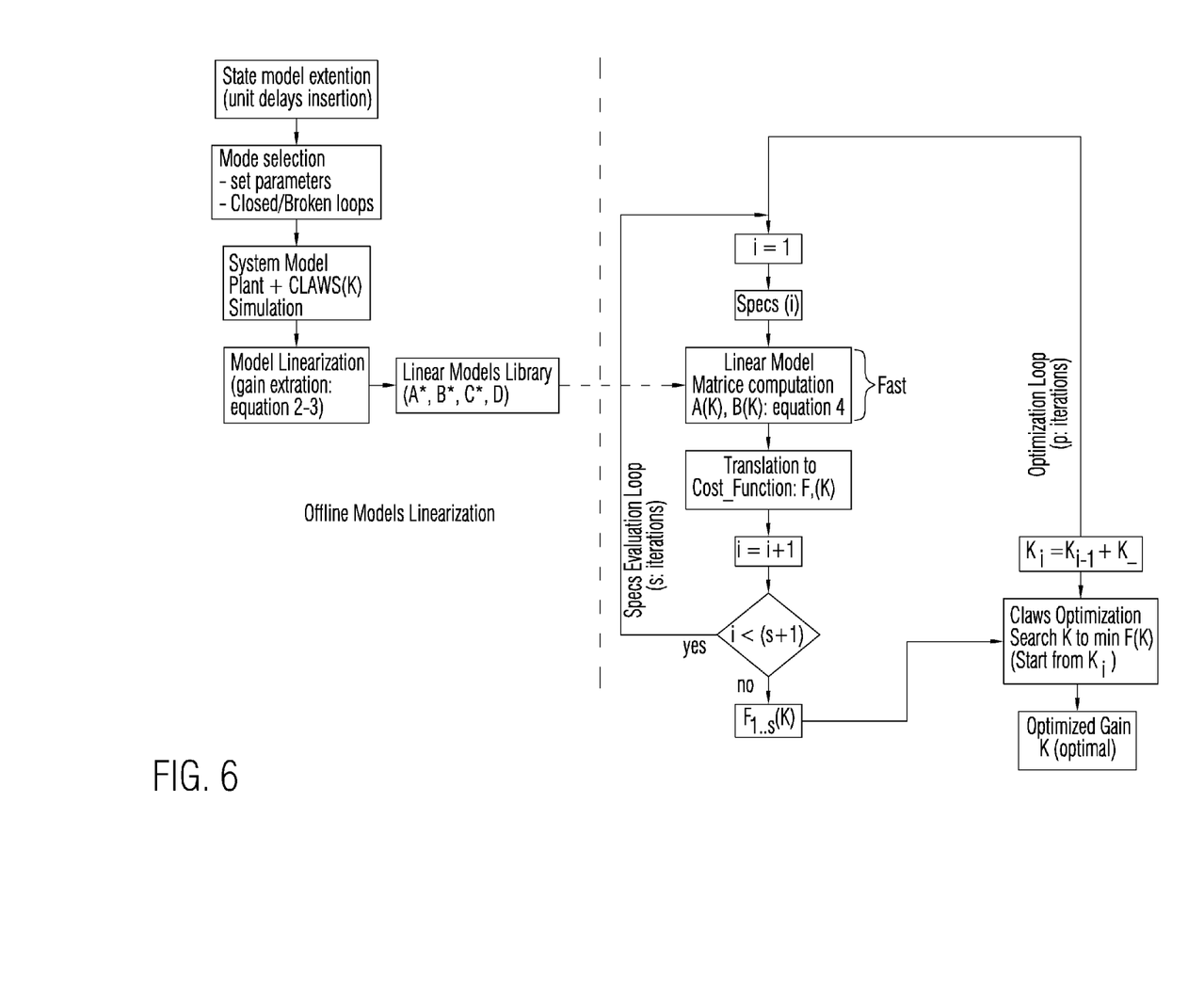
FIG. 6 is a schematic block diagram of a CLaw optimization algorithm according to one non-limiting embodiment of the present invention.

Therefore, the A and B matrices of the linear models are computed through matrix computations equations (4), which are then utilized by the CLaw optimization process (FIG. 6). The "system model" and "model linearization" blocks in FIG. 2 (conventional Claw optimization) are replaced by a "linear model" block in FIG. 6 (present invention CLaw optimization). The "linear model" block uses the "linear models library", the $A^*$, $B^*$, $C^*$ and $D^*$ matrices generated through the offline model generation process, and equation 4 in order to compute the linear models of the system.

$$\begin{cases} A(K) = \begin{bmatrix} \text{diag}(K) & 0^{k \times n} \\ 0^{n \times k} & \text{diag}(I^n) \end{bmatrix} A^*\ ; \\ C = [\ 0^{q \times k} \quad C^*\ ] \quad ; \end{cases} \quad (4)$$

$$\begin{aligned} B(k) &= \begin{bmatrix} \text{diag}(K) & 0^{k \times n} \\ 0^{n \times k} & \text{diag}(I^n) \end{bmatrix} B^* \\ D &= [\ 0^{q \times k} \quad C^*\ ] \end{aligned}$$

Figure 7:
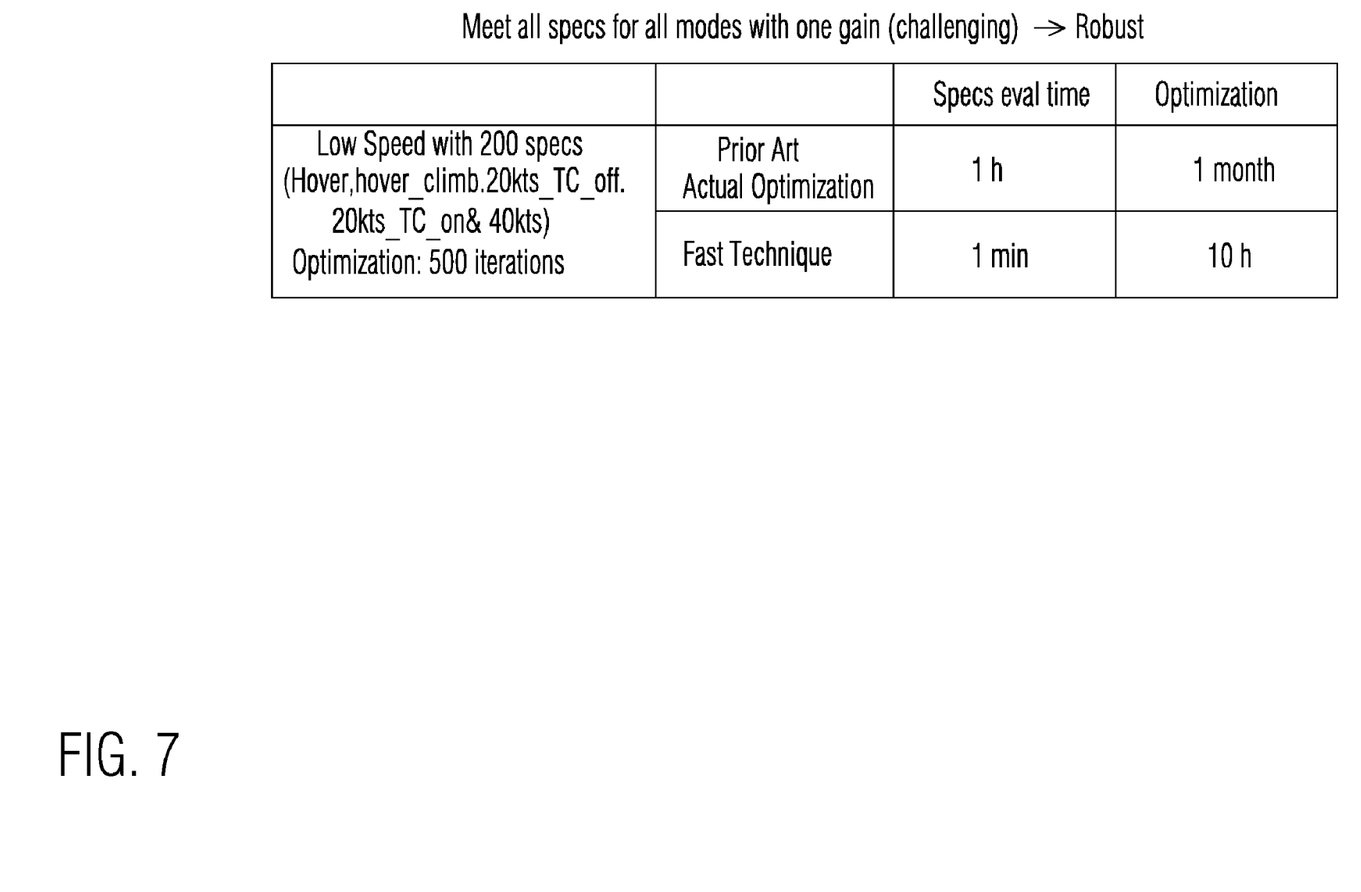
FIG. 7 is a chart illustrating the time required to determine a low speed mode with 200 specs for a prior art optimization as expressed in FIG. 2 as compared to the CLaw optimization algorithm according to one non-limiting embodiment of the present invention in FIG. 6.

The present invention facilitates a quite fast CLaw optimization process which thereby saves, in an aerospace environment for example, aircraft flight test time. This reduces development expense, ensures all specs are satisfied (efficiency), best exploits tradeoffs between competing specs stability/performances and constraints, improves expected handling qualities and available control authority. By increasing the number of specifications which can be readily incorporated in the present optimization method the expected handling qualities and the best use of available Control Authority are improved (FIG. 7). That is, the present invention allows for the efficient optimization of a large number of specifications to optimize several system configuration design points at once.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. Although certain particular exemplary embodiments of this invention have been disclosed, one of ordinary skill in the art would recognize that certain modifications would be within the scope of this invention. It is, therefore, to be understood that within the scope of the appended claims, the invention may be practiced otherwise than as specifically described. For that reason the following claims should be studied to determine the true scope and content of this invention.

What is claimed is:

1. A computer-implemented method to optimize control laws (CLaws) comprising:

inserting a unit delay downstream of at least one gain in a system model to define an extended system model;

linearizing the extended system model to define an extended linear state model;

computing on a computer at least one matrix from the extended linear model; and optimizing a control law using a plurality of linear models from a linear model library computed with the at least one matrix.

2. A method as recited in claim 1, wherein inserting the unit delay results in a gain state equation in the form of:

$$X_{K_i}(d+1)=K_i[A_i X_{ext}(d)+B_i U(d)];\ i=1 \ldots k$$

where $K_i$: $i^{th}$ Claw gain;

$X_{ext}=[X_K\ X_{sys}]' \in \Re$: extended state vector;

$X_K=[X_{K1} \ldots X_{Kk}]' \in \Re$: gain state vector;

$A_i \in \Re$ and $B_i \in \Re$ for $i=1 \ldots k$ are constant invariant matrices independent of the Claw gain K.

3. A method as recited in claim 1, wherein linearizing the extended system model to define the extended linear model results in a state equation in the form of:

$$\begin{cases} X_{ext}(d+1) = \begin{bmatrix} \text{diag}(K) & 0^{k \times n} \\ 0^{n \times k} & \text{diag}(I^n) \end{bmatrix} [A^* X_{ext}(d) + B^* U(d)] \\ Y(d+1) = [\ 0^{q \times k} \quad C^*\ ] X_{ext}(d) + D^* U(d) \end{cases}$$

where:

$X_{ext}=[X_K\ X_{sys}]' \in \Re$: extended state vector;

$X_K=[X_{K_1} \ldots X_{K_k}]' \in \Re$: gain state vector;

$A^* \in \Re$, $B^* \in \Re$, $C^* \in \Re$ and $D^* \in \Re$ are constant invariant matrices, independent of the Claw gain K, that are saved in the linear model library and are used to compute the linear models of the system.

4. A method as recited in claim 1, wherein computing the at least one matrix results in an equation in the form of:

$$\begin{cases} A(K) = \begin{bmatrix} \text{diag}(K) & 0^{k \times n} \\ 0^{n \times k} & \text{diag}(I^n) \end{bmatrix} A^*;\quad B(k) = \begin{bmatrix} \text{diag}(K) & 0^{k \times n} \\ 0^{n \times k} & \text{diag}(I^n) \end{bmatrix} B^*. \\ C = [\ 0^{q \times k} \quad C^*\ ];\qquad\qquad\qquad D = D^* \end{cases}$$

5. A method as recited in claim 1, wherein linearizing the extended system model to define the extended linear state model are computed through manipulation of the at least one matrix.

* * * * *

UNITED STATES PATENT AND TRADEMARK OFFICE
CERTIFICATE OF CORRECTION

PATENT NO. : 7,885,717 B2
APPLICATION NO. : 12/060185
DATED : February 8, 2011
INVENTOR(S) : Karim Khial It is certified that error appears in the above-identified patent and that said Letters Patent is hereby corrected as shown below:

IN THE CLAIMS:

Col. 6, lines 21-30:

Claim 2 should read as follows:

A method as recited in claim 1, wherein inserting the unit delay results in a gain state equation in the form of:

$$X_{K_i}(d+1) = K_i x [A_i X_{ext}(d) + B_i U(d)] \; ; \; i = 1 \cdots k$$

where:

$K_i$: $i^{th}$ Claw gain;

$X_{ext} = [X_K \, X_{sys}]' \in \Re^{k+n}$ : extended state vector;

$X_K = [X_{K1} \cdots X_{Kk}]' \in \Re^k$ : gain state vector;

$A_i \in \Re^{1 \times (k+n)}$ and $B_i \in \Re^{1 \times (m)}$ for $i = 1 \ldots k$ are constant invariant matrices independent of the Claw gain $K$.

Col. 6, lines 31-47:

Claim 3 should read as follows:

A method as recited in claim 1, wherein linearizing of the extended system model to define the extended linear model results in a state equation in the form of:

Signed and Sealed this
Sixteenth Day of August, 2011

David J. Kappos
*Director of the United States Patent and Trademark Office*

$$\begin{cases} X_{ext}(d+1) = \begin{bmatrix} diag(K) & 0^{k \times n} \\ 0^{n \times k} & diag(I^n) \end{bmatrix} \begin{bmatrix} A^* X_{ext}(d) + B^* U(d) \end{bmatrix} \\ Y(d+1) = \begin{bmatrix} 0^{q \times k} & C^* \end{bmatrix} X_{ext}(d) + D^* U(d) \end{cases}$$

where:

$X_{ext} = \begin{bmatrix} X_K & X_{sys} \end{bmatrix}' \in \Re^{k+n}$: extended state vector;

$X_k = \begin{bmatrix} X_{K_1} & \cdots & X_{K_k} \end{bmatrix} \in \Re^k$: gain state vector;

$A^* \in \Re^{(k+n) \times (k+n)}$, $B^* \in \Re^{(k+n) \times m}$, $C^* \in \Re^{q \times (n)}$ and $D^* \in \Re^{q \times (m)}$ are constant invariant matrices, independent of the Claw gain K, that are saved in the linear model library and are used to compute the linear models of the system.